MEANS FOR SUPPRESSING INTERFERENCE IN RADIO CIRCUITS

Filed Feb. 20, 1967 3 Sheets-Sheet 1

*INVENTOR.*
DAVID W. KERMODE
*BY*
ROY MILLER
ATTORNEY.

April 21, 1970 D. W. KERMODE 3,508,154
MEANS FOR SUPPRESSING INTERFERENCE IN RADIO CIRCUITS
Filed Feb. 20, 1967
3 Sheets-Sheet 2

INVENTOR.
DAVID W. KERMODE
BY
ROY MILLER
ATTORNEY.

INVENTOR.
DAVID W. KERMODE 3,508,154
MEANS FOR SUPPRESSING INTERFERENCE IN RADIO CIRCUITS

David W. Kermode, P.O. Box 126, Ridgecrest, Calif. 93555

Filed Feb. 20, 1967, Ser. No. 618,282
Int. Cl. H04b 1/68
U.S. Cl. 325—50 1 Claim

ABSTRACT OF THE DISCLOSURE

A means for suppressing interference in a radio circuit wherein the carrier is divided into upper and lower sidebands. Each sideband is separately modulated by identical modulating signals. One sideband is shifted in phase with respect to the other and both sidebands are transmitted. A receiver shifts the phase of the non-phase-shifted sideband by the same amount as the shift placed on the phase-shifted sideband, combines, and demodulates the sidebands, so that noise added to the sidebands attenuates.

The invention herein described may be manufactured and used by or for the Government of the United States of America for governmental purposes without the payment of any royalties thereon or therefor.

BACKGROUND OF THE INVENTION

The present invention relates to an interference free radio transmission and reception system, more particularly, to a novel means for communicating intelligence in such a manner that certain types of noise are canceled.

Many attempts have been made over the years to reduce the inherent noise or interference occurring in radio communications systems. Schemes employing either filters, voltage discriminators, phase discriminators, frequency discriminators, or combinations of these have been employed. In general, these noise suppression techniques have been either unduly complex or relatively ineffective to accomplish the desired result.

It is therefore a principal object of the present invention to provide an interference-free radio transmission and reception system.

Another object is to provide a noise suppression system which is simpler and more effective than comparable systems used heretofore.

A further object is to provide an improved system and method for communicating intelligence.

DESCRIPTION OF THE PREFERRED EMBODIMENT

Figure 1:
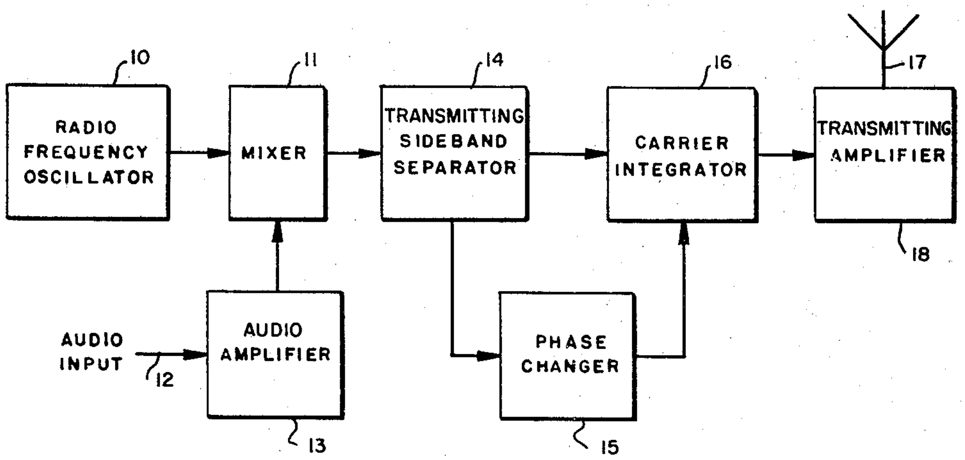
FIG. 1 is a block diagram showing an arrangement of components for radio transmission in accordance with the invention.

In FIG. 1 there is illustrated in block diagram an arrangement of components suitable for radio transmission using the present invention. A radio frequency oscillator 10, audio amplifier 12 and modulator (mixer) 11 constitute the transmitter up to the point of the initial operation. The mixer or modulator creates two sidebands separately and not necessarily phased in time. Transmitting sideband separator 14 divides the carrier generated by radio frequency oscillator 10 into upper and lower sidebands, each of which is modulated by audio input 12.

Phase changer 15 shifts the phase of one modulated sideband by some amount up to 180°. The phase-shifted sideband and the non-phase-shifted sideband are combined by carrier integrator 16 and transmitted through antenna 17 after amplification by transmitting amplifier 18.

One sideband is therefore changed in phase with respect to the other sideband by some 180° or less. The two sidebands are clamped and joined together by carrier integrator 16, however, one sideband is shifted from the original phase. The degree of phase shift is determined by the amplitude of the interference expected. Phase shifts on the order of 90° up to 180° are typically selected. The carrier is transmitted without returning the phase-shifted sideband to its original position, and the carrier frequency is not shifted with respect to the sidebands before transmission. Suppressed carrier transmission may be used. The transmission of two sidebands with one sideband shifted in phase, coupled to the condition that both sidebands carry the same modulation permits the receiver to phase out the interference or noise.

Figure 2:
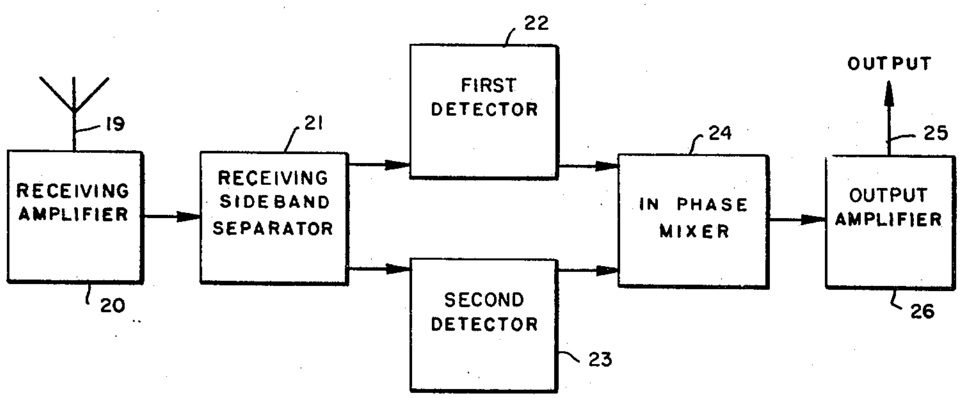
FIG. 2 is a diagram illustrating a receiver constructed in accordance with the invention.

Referring to FIG. 2, the carrier transmitted from antenna 17 is received by antenna 19 and amplified by receiving amplifier 20. The carrier contains both sidebands created by transmitting sideband separator 14. Receiving sideband separator 21 separates the sidebands contained in the carrier. First detector 22 demodulates one sideband and second detector 23 demodulates the second sideband. In-phase mixer 24 shifts the phase of the non-phase-shifted sidebands by the same amount as the shift placed on the phase-shifted sideband and combines them so that noise or interference cancels out. Output amplifier 26 produces output 25.

Figure 3:
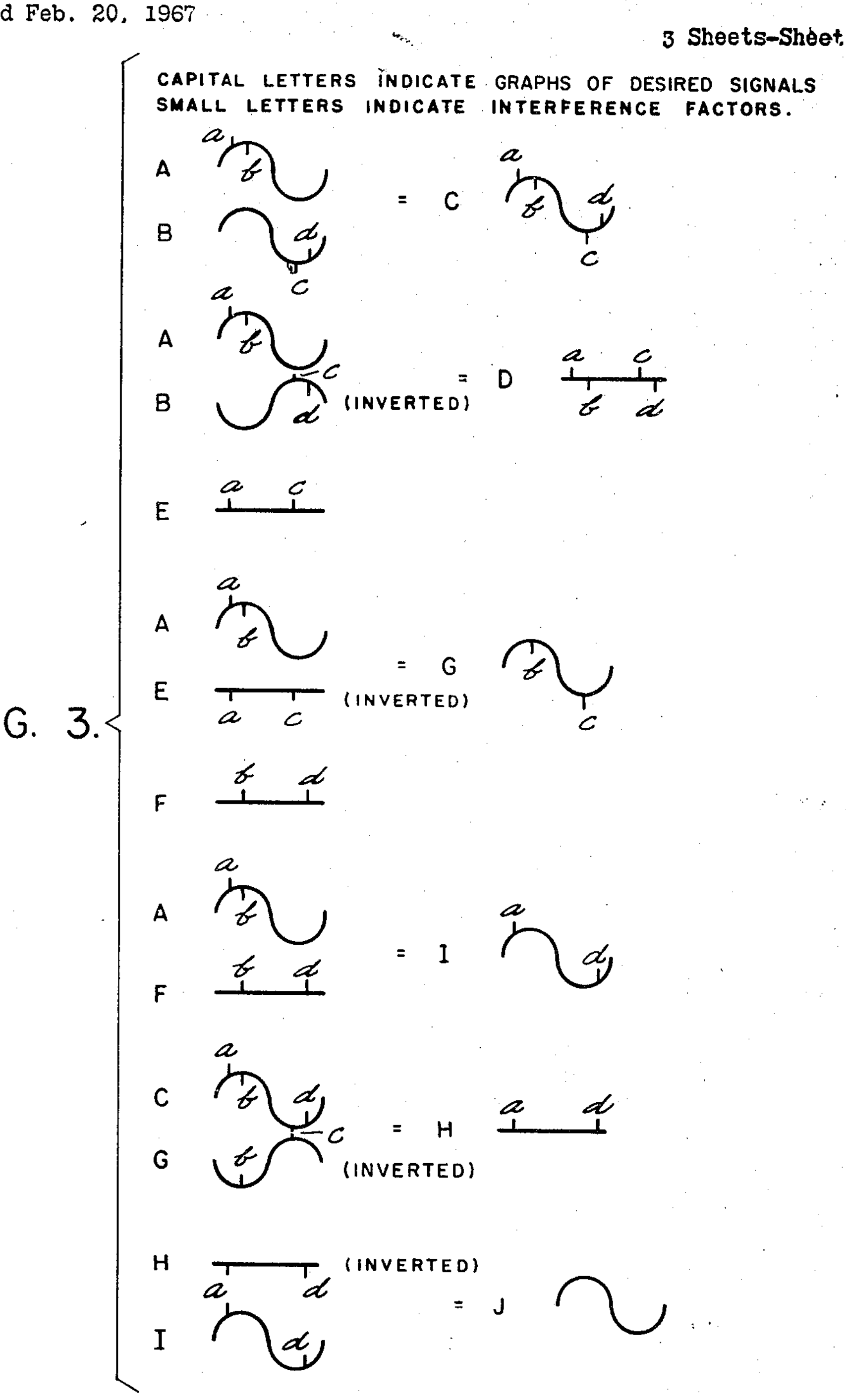
FIG. 3 is a diagram illustrating a signal in accordance with the invention.
Figure 4:
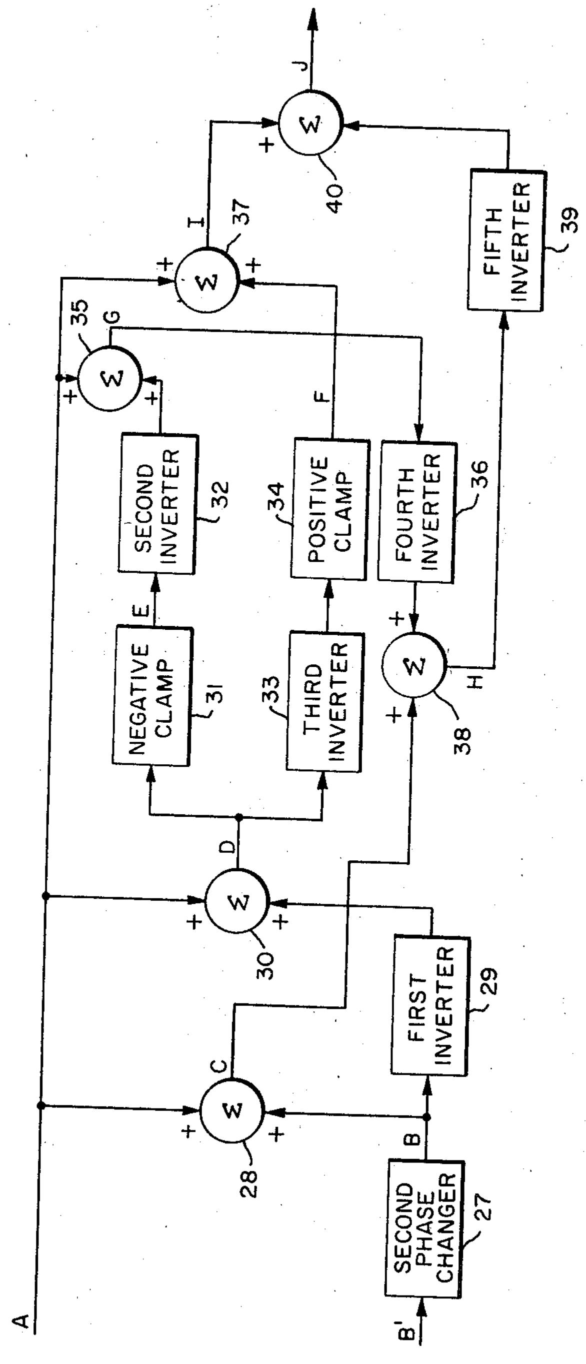
FIG. 4 is a schematic diagram of the in phase mixer shown in FIG. 3.

Referring to FIG. 4, a schematic diagram of in phase mixer 24 is shown. The phase-shifted sideband arrives at A and the non-phase-shifted sideband arrives at B′. Second phase changer 27 shifts the phase of the non-phase-shifted sideband by the same amount as the phase-shifted sideband. The output of second phase changer 27, B, is coincident in phase with A. Summer 28 combines sidebands A and B to form new wave-form C as shown in FIG. 3. First inverter 29 inverts wave-form B. The output of first inverter 29 and wave-form A are combined by summer 30 to produce new wave-form D. Wave-form D is clamped by negative clamp 31 and inverted by second inverter 32. The output of second inverter 32 and sideband A are combined by summer 35 to form new wave-form G. Third inverter 33 inverts wave-form D and positive clamp 34 clamps the positive values to form wave-form F. The output of positive clamp 34, wave-form F, and sideband A are combined by summer 37 to form new wave-form I. The output of summer 35 is inverted by fourth inverter 36 and combined with the output of summer 28 by summer 38 to form wave-form H. Wave-form H is inverted by fifth inverter 39 and combined with wave-form I, the output of summer 37, by summer 40 to produce wave-form J. Wave-form J is relatively clear of interference and noise factors.

The graphs shown in FIG. 3 demonstrate the combination of sidebands by in-phase mixer 24. Capital letters indicate graphs of desired signals and small letters indicate interference factors. Signals A and B combine in phase to produce graph C. Signals A and B combine out of phase to produce graph D, which indicates the phase-out of the desired signal with the remainder consisting of positive and negative interference and noise factors. If the negative values of D are clamped, graph E is produced. Combining signals A and E (with E inverted) produces graph G. If the interference factors represented in graph D are inverted and the negative factors *a* and *c* are clamped, the waveform shown in graph F is produced. If the signals of graph A are combined with the interference factors of F, the waveform produced is shown in graph I. If G is inverted and combined with C, the resulting waveform is shown in graph H, and cancellation of some of the interference factors occurs. If H is now inverted in phase (the polarities are reversed) and signals of H and I are combined, the resulting waveform is shown in graph J. Assuming all the equipment components are adjusted, the signal represented by J is the desired signal relatively clear of interference and noise factors.

The average power of random noise factors will not appear. Variations from that average power will be greatly reduced or canceled out. Interference factors appearing on both sideband modulation envelopes but 180° out of phase will be reduced by an amount equal to the differences in interference amplitude between the modulation envelopes on both sidebands. Other interference factors will be canceled out.

A sideband phase position identifier may be used to place a pulse on both the sidebands after one sideband has been shifted in phase. The time between pulses is made representative of the relative phase shift of one sideband with respect to the other, so that when the phase shift is altered the pulse period is changed to correspond to the change in phase. This piece of equipment might be helpful in cases of phase shift caused by atmospheric conditions as well as against jamming.

Obviously many modifications and variations of the present invention are possible in the light of the above teachings. It is therefore to be understood that the invention may be practiced otherwise than as specifically described.

What is claimed is:

1. In a communication system the combination of:

means for generating a radio frequency carrier wave;

single modulator means for creating an upper and lower sideband from said radio frequency carrier wave, said sidebands being separately modulated by identical signals;

means for shifting the phase of one of the modulated sidebands by an amount less than 180°;

means for combining the phase-shifted and the non-phase-shifted sidebands;

means for transmitting the combined sidebands;

means for receiving the combined sidebands;

means for separating the received sidebands into said phase-shifted and non-phase-shifted sidebands;

means for detecting the modulation placed on that sideband which was phase-shifted prior to transmission;

means for detecting the modulation placed on that sideband which was not phase-shifted prior to transmission;

means for shifting the phase of the non-phase-shifted sideband by the same amount as the phase shift placed on the phase-shifted sideband at transmission; and means for summing the detected modulation of that sideband which was phase-shifted prior to transmission and that sideband which was non-phase-shifted prior to transmission comprising:

means for summing the phase-shifted and non-phase-shifted sidebands to produce a first output, means for inverting the non-phase-shifted sideband, means for summing the phase-shifted sideband and the inverted non-phase-shifted sideband to produce a second output, means for clamping the negative values on the second output to produce a third output, means for inverting the third output, means for summing the phase-shifted sideband with the inverted third output to produce a fourth output, means for inverting the second output, means for clamping the negative values on the inverted second output to produce a fifth output, means for summing the phase-shifted sideband and the fifth output to produce a sixth output, means for inverting the fourth output, means for summing the first output and the inverted fourth output to produce a seventh output, means for inverting the seventh output, and means for summing the sixth output and the inverted seventh output to produce an eighth output; so that the eighth output is free of noise components acquired by the phase-shifted and non-phase-shifted sidebands during transmission.

References Cited

UNITED STATES PATENTS

| | | | |
|---|---|---|---|
| 1,976,393 | 10/1934 | Hammond | 325—138 |
| 3,084,329 | 3/1963 | Clay | 325—65 |
| 1,935,776 | 11/1933 | Hammond | 325—65 |
| 2,175,270 | 10/1939 | Koch | 325—65 XR |
| 2,880,275 | 3/1959 | Kahn | 325—56 |

ROBERT L. GRIFFIN, Primary Examiner

C. R. VON HELLENS, Assistant Examiner

U.S. Cl. X.R.

179—15; 325—60, 65; 328—162